United States Patent
Jacobsen et al.

(10) Patent No.: US 6,780,387 B1
(45) Date of Patent: Aug. 24, 2004

(54) PROCESS FOR THE PREPARATION OF AMMONIA

(75) Inventors: Claus J. H. Jacobsen, Jaegerspris (DK); Michael Boe, Klampenborg (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/720,645

(22) PCT Filed: Jul. 1, 1999

(86) PCT No.: PCT/EP99/04560

§ 371 (c)(1),
(2), (4) Date: Jul. 10, 2001

(87) PCT Pub. No.: WO00/01616

PCT Pub. Date: Jan. 13, 2000

(30) Foreign Application Priority Data

Jul. 1, 1999 (DK) .................................... 1998 00892

(51) Int. Cl.⁷ ................................................ C01C 1/04
(52) U.S. Cl. ...................................... 423/359; 423/362
(58) Field of Search ............................... 423/352, 362, 423/359

(56) References Cited

U.S. PATENT DOCUMENTS

| 3,965,246 | A | * | 6/1976 | Hinrichs | ..................... 423/361 |
|---|---|---|---|---|---|
| 4,073,749 | A | * | 2/1978 | Passariello | ..................... 502/63 |
| 4,181,701 | A | | 1/1980 | Topsoe et al. | |
| 4,298,588 | A | * | 11/1981 | Pinto | ........................... 423/359 |
| 4,430,254 | A | * | 2/1984 | Passariello | ................... 502/243 |
| 4,668,657 | A | * | 5/1987 | Jennings | ..................... 502/328 |
| 4,822,586 | A | * | 4/1989 | Shannahan | .................. 423/359 |

FOREIGN PATENT DOCUMENTS

| DE | 20 19 706 | 11/1971 |
|---|---|---|
| EP | 0 060 622 | 9/1982 |
| FR | 2 448 384 | 9/1980 |
| GB | 2 077 613 | 12/1981 |

OTHER PUBLICATIONS

Derwent Database No. XP002119097, Abstract for SU 321045A. See PCT search report.

* cited by examiner

*Primary Examiner*—Wayne A. Langel
(74) *Attorney, Agent, or Firm*—Westerman, Hattori, Daniels & Adrian, LLP

(57) ABSTRACT

Process for the preparation of ammonia by contacting an ammonia synthesis gas with ammonia catalyst particles arranged in a fixed bed, wherein the fixed bed comprises catalyst particles of the ammonia catalyst with a particle size being in the range of <1.5 mm and ≧2.2 mm.

2 Claims, No Drawings

PROCESS FOR THE PREPARATION OF AMMONIA

The present invention is directed to the preparation of ammonia by catalytic conversion of an ammonia synthesis gas.

Conventionally, industrial ammonia synthesis is based on conversion of ammonia synthesis gas consisting of hydrogen and nitrogen in a substantially stoichiometric mole ratio of 3:1. The synthesis gas is passed at high pressure through a fixed bed of ammonia catalyst particles of mainly magnetite, which is converted by reduction into the catalytically active form of α-iron.

The process performance is governed not only by the catalyst composition, but also by the size and shape of the catalyst particles. For ammonia synthesis processes operating at catalyst beds with an axial synthesis gas flow the usual catalyst particle size is in the range of 6–10 mm.

Due to a reduced flow resistance in radial flow type ammonia reactors the catalyst particle size employed in these reactors is between 1.5 and 3 mm.

It has now been found that process performance of ammonia synthesis still may be improved in terms of a higher ammonia product yield when employing in radial ammonia reactors a fixed catalyst bed of ammonia catalyst with a mixed composition of catalyst particles having a large size and small size. A mixture of large size and small size particles results in higher bulk density due to smaller particles pack in voids being formed between larger particles. Higher bulk density provides an increased amount of catalyst in the ammonia reactor resulting in a higher catalytic activity per reactor volume.

Pursuant to the above finding, this invention is a process for the preparation of ammonia by contacting an ammonia synthesis gas with ammonia catalyst particles arranged in a fixed bed, wherein the fixed bed comprises catalyst particles of the ammonia catalyst with a particle size being in the range of less than 1.5 mm and larger than or equal with 0.2 mm.

By inclusion of a significant amount of particles with a size within the specified range, the bulk density increases causing a higher pressure drop over the catalyst bed, and, thereby, an improved flow distribution of the synthesis gas within the bed.

When operating the inventive process at industrial conditions an improved flow distribution of synthesis gas is obtained when the catalyst bed contains between 10% and 80% by volume of ammonia catalyst particles having a particle size below 1.5 mm.

The Table below summarizes the relative density of different particle sizes of conventional ammonia catalysts commercially available from Haldor Topsøe A/S.

TABLE

| Particle Size/mm | $\rho$ rel. |
|---|---|
| 1.5–3.00 | 1.00 |
| 0.8–1.5 | 0.97 |
| 0.3–0.8 | 0.95 |
| 60% 1.5–3.0 + 20% 0.8–1.5 + 20% 0.3–0.8 | 1.09 |

A mixture containing 60%, 20% and 20% of 1.5–3 mm, 0.8–1.6 mm and 0.3–0.8 mm particles, respectively, has a relative bulk density of 1.09.

The absolute bulk density of the industrial catalyst depends on the loading procedure, however, the same relative density can be found.

Inclusion of 0.2–1.5 mm sized catalyst particles provides higher catalyst bulk density, and also a lower diffusion resistance. By the broader particle size distribution and the increased bulk density a higher pressure drop is obtained over the catalyst bed causing a significant improved flow distribution of the synthesis gas in the catalyst bed.

At present a preferred particle size distribution of ammonia catalyst arranged as fixed bed is obtained by mixing particles with a size of 1.5–3.0 mm, 0.8–2.5 mm, and 0.3–0.8 in a weight ratio of 40–70:10–40:10–30.

What is claimed is:

1. Process for the preparation of ammonia by contacting an ammonia synthesis gas with ammonia catalyst particles arranged in a fixed bed comprising catalyst particles with a particle size in the range of $\geq 0.2$ mm to $<1.5$ mm, said synthesis gas being passed in radial direction through said fixed bed, wherein said fixed bed contains a mixture of catalyst particles with a size of 1.5–3.0 mm, 0.8–1.5 mm and 0.3–0.8 mm in a volume ratio of (40–70):(10–40):(10–30).

2. The process of claim 1, wherein the fixed bed contains at least 10% by volume of catalyst particles having a particle size in the range of $\geq 0.2$ mm to $<1.5$ mm.

* * * * *